United States Patent [19]

Tauer

[11] Patent Number: 4,946,254

[45] Date of Patent: Aug. 7, 1990

[54] IMAGE SHIFTING DEVICE FOR TRACING

[76] Inventor: Wayne R. Tauer, 8231 Queen Ave. North, Brooklyn Park, Minn. 55444

[21] Appl. No.: 265,218

[22] Filed: Oct. 31, 1988

[51] Int. Cl.⁵ .................. G02B 7/18; G02B 27/14; G02B 5/08

[52] U.S. Cl. .................................. 350/174; 350/602; 434/88

[58] Field of Search ................ 350/174, 602; 434/88; 33/1 K

[56] References Cited

U.S. PATENT DOCUMENTS

| | | | |
|---|---|---|---|
| 670,290 | 3/1901 | McFarland | 350/602 |
| 1,029,248 | 6/1912 | Williams | 350/174 |
| 1,212,938 | 1/1917 | Grubman | 350/174 |
| 1,479,691 | 1/1924 | Anstock . | |
| 1,970,035 | 8/1934 | Enright | 88/1 |
| 1,971,119 | 8/1934 | O'Neil | 88/1 |
| 2,079,508 | 5/1937 | Kaplowitz | 88/75 |
| 3,227,043 | 1/1966 | Swimmer et al. | 88/75 |
| 3,324,574 | 6/1967 | Markley | 35/26 |
| 3,599,338 | 8/1971 | Gillespie et al. | 350/174 |
| 3,741,624 | 6/1973 | Kuntz | 350/121 |
| 3,749,472 | 7/1973 | Young | 350/121 |
| 4,226,029 | 10/1980 | McGuire | 35/26 |

FOREIGN PATENT DOCUMENTS

| | | | |
|---|---|---|---|
| 38908 | 8/1889 | Fed. Rep. of Germany | 350/602 |
| 200929 | 4/1922 | United Kingdom | 350/602 |

*Primary Examiner*—Jon W. Henry
*Attorney, Agent, or Firm*—Nickolas E. Westman

[57] ABSTRACT

A device for image shifting to permit tracing a drawing or other configuration from an original onto a sheet that is positioned at a location shifted from the original. The device includes a mirror which reflects an image onto a reflective surface of a partially reflective or semi-transparent panel, and the viewer then sights through the part-reflective surface so that the line of sight projects the image onto a surface displaced from the original. This provides for amusement and rapid free-hand sketching. The displaced image as viewed remains properly oriented on the sketch paper.

5 Claims, 2 Drawing Sheets

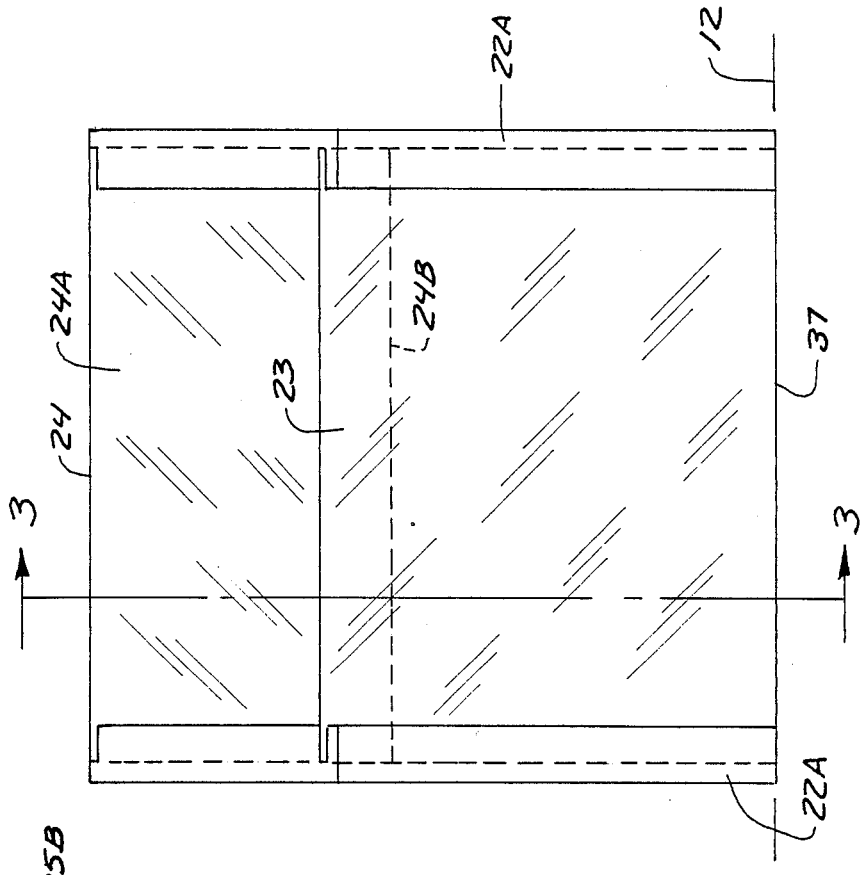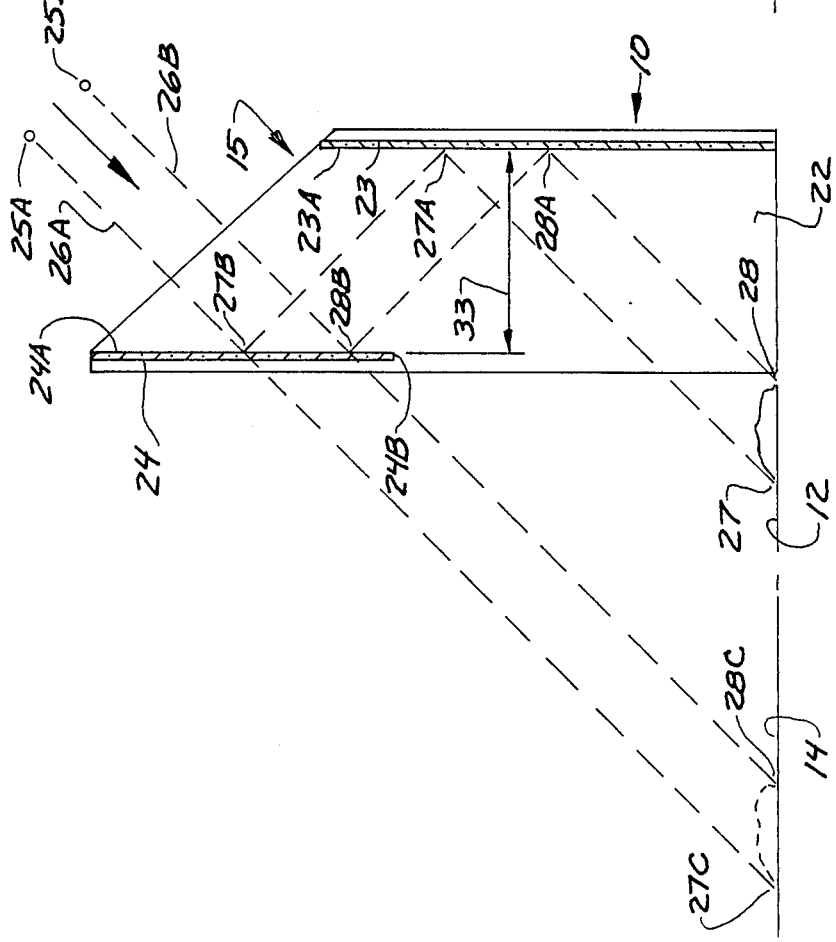

IMAGE SHIFTING DEVICE FOR TRACING

BACKGROUND OF THE INVENTION

1. Field of the Invention

The present invention relates to an apparatus that permits sketching of a reflected image at a position offset from the original.

2. Description of the Prior Art

Image shifting tracing devices have been disclosed in the prior art, but each of the devices in the prior art have deficiencies which make use difficult. U.S. Pat. No. 1,970,035 utilizes a glass pane that reflects sufficiently so that the image that is seen on the glass pane will be viewed as being on a sheet of paper that is shifted from the image, but it is also inverted from the orientation of the original of the image.

U.S. Pat. No. 3,324,574 shows a device that essentially provides an image on a sheet of paper that is used for silhouette forming. It utilizes a mirror in a housing that has a glass sheet in front of the mirror angled at a 45°. A peep hole is used, which makes viewing the image difficult, and the image that is reflected onto the glass sheet will be seen as overlying the dark surface of the tracing sheet that is used for cutting out the silhouette. As stated, a peep hole is used, and the orientation is in a different plane than the horizontal surface which is desired for doing tracing.

U.S. Pat. No. 2,079,508 shows a structure that has a housing that is positioned above a sheet of paper, and a mirror reflects a generally vertical picture onto a transparent or semi-transparent plate of material, and by looking through a view finder at the top, the image will be reflected down onto the sheet of paper.

U.S. Pat. No. 3,227,043 also shows a glass plate and a mirror for providing an image that is shifted from one location to another, but the patent discloses a substantially different way of doing it than the present device.

While the above patents show the general idea of image shifting, the structures become either quite complex, or lose light intensity because of projecting through a glass initially, and then through the partial reflecting or partial transparent glass. Others need an eye piece because of the way they are set up. The existing devices require the user to peer through an eye piece to maintain a single or constant point of sight. If, in these devices, the eye pieces were not provided the image would shift, making tracing difficult.

With the present device, the image does not move if the head or the viewing location changes. The image stays constant no matter from which point, or line of sight, the viewer chooses. This eliminates the need for an eye piece and provides a wide field for viewing, making operation easy.

Other patents which show the general state of the art and are of general interest include the following:
U.S. Pat. No. 1,479,691;
U.S. Pat. No. 1,971,119;
U.S. Pat. No. 3,741,624;
U.S. Pat. No. 3,749,472; and
U.S. Pat. No. 4,226,029.

SUMMARY OF THE INVENTION

The present invention relates to an image shifting tracing device of simple construction and providing reliable use, which utilizes a pair of substantially parallel plate members, one of which forms a mirror and the other of which is a partial reflecting pane, such as a sheet of semi-transparent plastic or glass (sometimes called a smoked glass), that is of a dark color, but which transmits light. The plate members are supported in a frame to support and hold them in proper position over a horizontal surface (preferably) to shift an image that is under the frame horizontally in direction of sight for tracing. The image will appear on a piece of paper offset from the original when sighting is made through the semi-transparent glass, and it can be traced onto the paper in a properly oriented manner.

The support plane of the base of the framework can be adjusted for parallelism if desired and also for providing a raised reference plane to aid in providing a good representation of a three-dimensional object. The frame and panels provide an adequate and simple tracing device for tracing an image on a sheet of paper, photograph, or the like.

BRIEF DESCRIPTION OF THE DRAWINGS

FIG. 2 is a front elevational view of a device such as that shown in FIG. 1;

FIG. 3 is a sectional view taken as on line 3—3 in FIG. 2;

DETAILED DESCRIPTION OF THE PREFERRED EMBODIMENTS

An image shifting tracing device indicated generally at 10 comprises a plurality of individual frame members, and is supported onto a support panel 11, on which a paper 12 is resting. The sheet of paper 12 will have an image on the sheet of paper that is to be transferred to a second sheet of paper or to a second region shown generally at 14 on the same surface or, if desired, on a surface at a different level.

Figure 1:
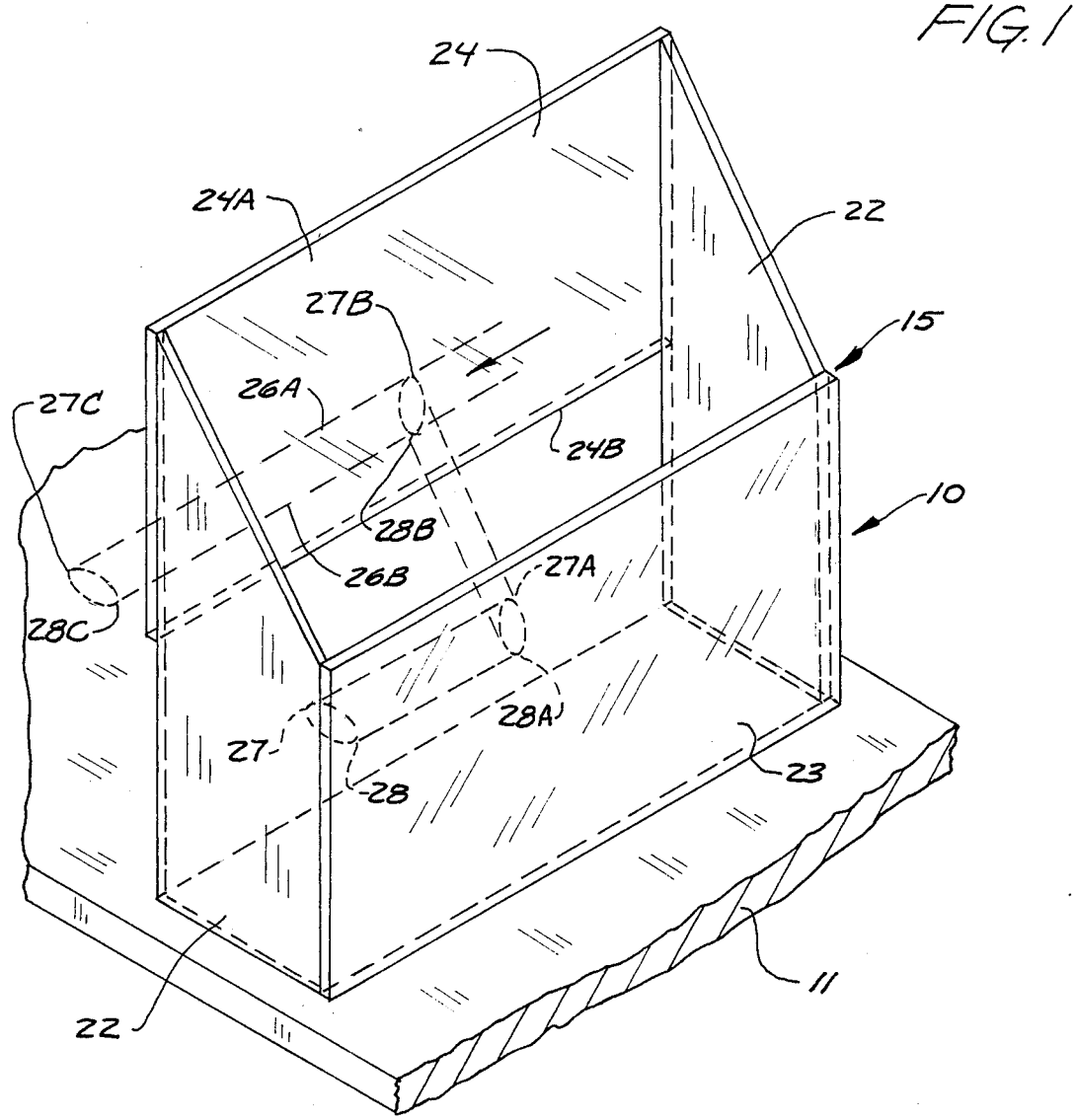
FIG. 1 is a perspective view of an image shifting device for tracing made according to the present invention.

Image shifting device 10 comprises an open framework 15 that includes a pair of side frame members or end panels shown in FIG. 1 at 22,22 that are spaced laterally apart. Frame 15 includes a first mirror panel 23 (the inside surface is the reflecting surface as indicated at 23A) which joins the end panels 22,22 and terminates on a common bottom plane 37 with the end panels that rest on the panel 11, and/or the paper that is used. The mirror panel 23 is fixed to the end panels.

In addition, a semi-transparent (partially reflecting) panel 24 is connected to the end panels 22,22 on an opposite side of the end panels, and thus is spaced from the mirrored panel 23 by a desired amount. The semi-transparent panel 24 does not extend all the way down to the bottom plane 37 resting on panel 11, but as shown terminates above this level. This permits the image to be copied to be viewed through the space below the lower edge of panel 24. Bottom edge 24B of panel 24 is thus spaced up from the level of the paper 12. The top edge of panel 24 extends to a level above the mirror panel 23 so a user can look through panel 24.

The panels 23 and 24 are parallel, and are spaced apart in a direction parallel to the plane of support surface or paper that has the image which is to be traced.

The end panels 22 are transparent in FIG. 1 and the panels 23 and 24 can be cemented in place.

In FIGS. 2 and 3, the device is the same, except thicker end panels 22A are used. Slots for receiving the panels 23 and 24 are formed in the end panels 22A.

Referring specifically to FIGS. 1, 2 and 3, and in particular FIG. 2, two lines of sight from a viewer are indicated by lines 26A and 26B, and it can be seen that the viewer is viewing from above the frame and in a direction of sight to look through the partially reflective or semi-transparent panel 24. For example, the viewer is above and on a side of the partially reflective panel 24 in a direction toward the panel 23. In this manner, when the viewer looks along a line of sight 26A that corresponds to the point 25A which comprises the origin point of sight line 26A, so that as the person's line of sight passes over the mirrored panel 23 and through the partially reflective panel 24, a reflected point will be seen on surface 24A. For example, if there is a point 27 on an original image on paper 12, such point is reflected on mirror surface 23A at a point 27A, along a line of sight indicated by dotted lines between points 27 and 27A, when the line of sight 26A is intersecting the surface of the partially reflective panel 24 at a point 27B. Panel 24 reflects the image at point 27, so the viewer sees that point. This line of sight, then, extending as at 26A also passes through the partially reflective panel 24 and terminates at a point 27C on the paper 14 on which the original image is to be traced. In other words, the sight point 25A appears to see the point 27 shifted to point 27C because of the reflecting of the image onto the surface 24A from point 27A on the mirror, which reflects the original point. The sight line through panel 24 makes the point 27B appear to be at point 27C so it can be traced onto paper 14.

Likewise, if there is a sight originating point 25B extending along a sight line 26B, this will pick up a point 28B reflected from mirror surface 23A at point 28A, which in turn was a reflection of point 28. The line of sight 26B which passes through the partially reflective or semi-transparent panel 24 will make the point 28B appear as being in position 28C on the paper 14. The reflections will offset the point 28 by the distance from point 28 to point 28C so that when an image is traced at the locus of points of sight forming the image, the image will be offset onto a separate paper 14. This will permit one to trace or copy images, figures, and the like with simplicity and with accuracy.

The end panels 22 are preferably transparent so that light is admitted from the sides of the unit, onto the original image so that no additional lighting is necessary. The thicker end panels 22A can be used for more strength and support.

The amount of offset of the images can be controlled by controlling the horizontal dimension indicated generally at 33 in FIG. 2 between reflecting surface 23A and partially reflecting surface 24A. The image will always appear in its correct orientation because there are two reflecting points.

Figure 4:
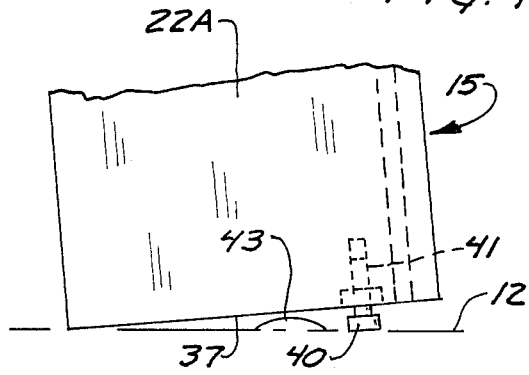
FIG. 4 is a fragmentary side elevational view showing an adjustment screw arrangement that can be utilized for adjusting the support plane of the frame.
Figure 5:
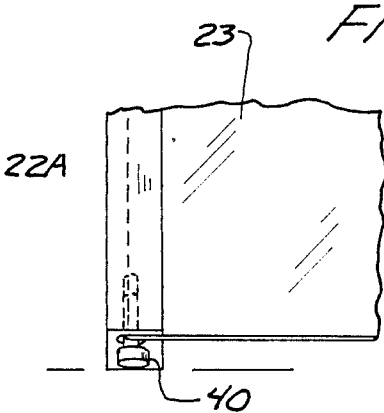
FIG. 5 is a front view of the leveling screw of FIG. 1 showing one side of the image shifting device.

Three-dimensional objects can be copied accurately by use of a leveling or an adjustment screw as shown in FIGS. 4 and 5 schematically. The bottom plane 37 of the frame 15 can be changed to be at an angle or inclination with respect to the support plane of the paper 12. A screw 40 can be threaded into the thicker end panels 22A, and then can be adjusted longitudinally to change the angle of the plane 37 and thus also the angle of the planes of panels 23 and 24 with respect to the plane of paper 12. If the three-dimensional object indicated schematically at 43 is supported on the paper 12, the plane 37 can be made to lie across the peak of the three-dimensional object so that the image plane is shifted to that comprising the top plane of the three-dimensional object.

The adjustment screws also can be used for minor corrections if the mirror 23 and the plane of the partially reflective panel 24 are not precisely parallel. It can be seen that a recess 41 for the head of the screw 40 can be provided so that the plane 37 can coincide with the plane of the paper 12.

The device is relatively simple, and can be used without any additional lighting. The partially reflective panel presents a full view surface because it is unobstructed across its full width between the end panels. It also has a substantial surface area offset from the top edge of the mirrored panel to present a large image region.

Although the present invention has been described with reference to preferred embodiments, workers skilled in the art will recognize that changes may be made in form and detail without departing from the spirit and scope of the invention.

What is claimed is:

1. A tracing apparatus comprising a frame for mounting onto a surface having an original image to be transferred to another location offset from the original image, the original image being on a first support surface portion, the frame including:

a first panel oriented substantially perpendicular with respect to the support plane and having a mirrored first surface;

a second semi-transparent panel having the ability to reflect an image on one surface and to transmit light through the panel simultaneously, said second panel being spaced from said first panel a desired amount in the direction of sight of a user with the one surface facing the mirrored surface and facing a user whereby a user viewing the one side of the second panel and looking through the second panel sees an image reflected from the mirror surface of the first panel onto the second panel, the image reflected on the second panel being on a line of sight of the viewer carrying onto a second support surface portion offset from the original image on the first surface portion to permit tracing the image at the second support surface portion, the first and second panels being generally parallel to each other; and adjusting screw means mounted on the frame for engaging a support surface and for adjustably changing the angle of the first and second panels relative to a support surface.

2. The apparatus as specified in claim 1 wherein said second panel is spaced from the plane of support a desired amount and has a remote edge extending farther from the support plane than the first panel.

3. The apparatus of claim 1 wherein said frame has side panels supporting said first and second panels, said side panels being spaced apart a desired amount.

4. The apparatus as specified in claim 3 wherein said side panels are transparent to admit light onto the original image.

5. The apparatus of claim 1 wherein the lower edge of the side panels have adjusting screw means for adjustably changing the angle of the first and second panels relative to a support surface.

* * * * *